United States Patent [19]
Sakai et al.

[11] Patent Number: 5,861,682
[45] Date of Patent: Jan. 19, 1999

[54] DISTRIBUTOR

[75] Inventors: Michio Sakai; Ryouzou Hosoya; Nobuyuki Orito; Minoru Nakahata, all of Marugame, Japan

[73] Assignee: Mitsubishi Denki Kabushiki Kaisha, Tokyo, Japan

[21] Appl. No.: 39,319

[22] PCT Filed: Aug. 21, 1992

[86] PCT No.: PCT/JP92/01059

§ 371 Date: Jun. 10, 1993

§ 102(e) Date: Jun. 10, 1993

[87] PCT Pub. No.: WO93/04515

PCT Pub. Date: Mar. 4, 1993

[30]    Foreign Application Priority Data

Aug. 23, 1991  [JP]  Japan ................................ 3-211784

[51] Int. Cl.⁶ ..................................................... H02J 1/00
[52] U.S. Cl. ............................... 307/11; 307/17; 307/29; 307/41; 307/147
[58] Field of Search ............................... 307/11, 17, 29, 307/38–41, 147, 92

[56]    References Cited

U.S. PATENT DOCUMENTS

| | | | |
|---|---|---|---|
| 3,949,238 | 4/1976 | Brookes | 307/64 |
| 4,772,806 | 9/1988 | Lean et al. | 307/38 |
| 5,073,848 | 12/1991 | Steigerwald et al. | 307/29 |
| 5,210,443 | 5/1993 | Kugler | 307/17 |

FOREIGN PATENT DOCUMENTS

| | | |
|---|---|---|
| 0 049 642 | 4/1982 | European Pat. Off. . |
| 1 492 559 | 9/1966 | France . |
| 2 530 881 | 1/1984 | France . |
| 37 43 028 | 6/1989 | Germany . |
| 61-8645 | 1/1986 | Japan . |
| 61-8645 | 3/1986 | Japan . |

OTHER PUBLICATIONS

Binder et al., "Gesichtspunkte für den bau moderner Netzstationen," 1971.

Zache, Franz and Binder, Walter, "Gesichtspunkte für den Bau moderner Netzstationen," Techn.Mitt.AEG–Telefunken, vol. 61, No. 1, pp. 36–47 (1971).

Scheifele, Jürgen et al., "$SF_6$–isoliertes Ringkabelfeid als Schaltanlage in Industrienetzen," ETZ Elektrotechnische Zeitschrift, vol. 110, No. 17, pp. 894–898 (Berlin, Sep. 1989).

Kulik, Peter, "Gesichtspunkte für die Planung von Hoch–und Mittelspannungs–Schaltanlagen," Techn.Mitt.AEG–Telefunken, vol. 59, No. 2, pp. 87–94 (1969).

Primary Examiner—Jonathan Wysocki
Assistant Examiner—Jonathan Kaplan
Attorney, Agent, or Firm—Burns, Doane, Swecker & Mathis, LLP

[57]    ABSTRACT

In a distributor, a plurality of switches are connected in series with one another on main distribution lines emerging from a receiver switching apparatus, thus forming a trunk. A branch line extends from a junction between each pair of adjoining switches and leads to each load via another switch and a transformer, wherein each pair of switches on the trunk is formed as a single branch unit, and the switch and transformer are united as a power package. In each power package, a supply bushing and a load bushing are placed on the top of a transformer, and shielded with closed housings. A switch is placed in the closed housing for the supply bushing, and a distribution board is placed in the closed housing for the transformer. This configuration enables the disconnection of any branch distribution lines from the main distribution lines and diminishes the installation space.

13 Claims, 10 Drawing Sheets

DISTRIBUTOR

TECHNICAL FIELD

The present invention relates to a distributor for use in a power distribution system at a building, factory, or the like.

BACKGROUND ART

FIG. 11 shows a conventional distribution system at a building. In FIG. 11, 1 denotes a building. 2 denotes receiver switching apparatus installed in an electric room on the basement of the building 1. 3 denotes a circuit breaker. 4 denotes a high-tension bus. 5 denotes circuit breakers. 6 denotes transformers. 7 denotes molded-case circuit breakers associated with loads. 8 denotes cables to be connected to the loads.

The receiver switching apparatus 2 places received power on the high-tension bus via the circuit breakers 3. Branch circuit breakers associated with loads in the building 1 are connected over the high-tension bus 4. Power is fed to the loads via the transformers 6 and molded-case circuit breakers 7. This equipment is usually installed in a main electric room on the basement. In a large-scale building, the equipment is installed in a sub-electric room, which receives power from the main electric room, on each floor. From the electric rooms, cables are laid radially toward loads.

A prior art relating to loop distribution has been disclosed in Japanese Patent Laid-Open No.61-8645, which, however, poses a problem concerning the safety within a cable shaft. Besides, when an attempt is made to modify the rating of a branch transformer, a power cut becomes necessary. Thus, the handling efficiency is poor.

A conventional distributor has the aforesaid configuration that cables are laid radially from an electric room to loads. A lot of cables are therefore required, many man-hours are needed for cable connection, and eventually the construction costs become high. Furthermore, it takes a lot of time to complete the construction.

A conventional loop distribution facility has problems concerning safety and handling efficiency.

The present invention attempts to solve the above problems. An object of the present invention is to provide a distributor that can easily be put into operation with a simple configuration. Another object of the present invention is to provide high-safety distribution equipment for a distributor. Yet another object of the present invention is to provide a distributor permitting uninterrupted power feed with high reliability.

SUMMARY OF THE INVENTION

In a distributor relating to the present invention, a plurality of switches are connected in series with one another on main distribution lines emerging from a receiver switching apparatus, thus forming a trunk. A branch line extends from a junction between each pair of adjoining switches and leads to each of distributed loads via a switch and a transformer.

Switches are combined in twos to form independent branch units. The branch units are connected in series with one another on main distribution lines emerging from a receiver switching apparatus, thus forming a trunk. Power packages in each of which another switch and a transformer are connected in series with each other are connected to the branch units, via which branch lines extend to loads.

For a compact arrangement, the branch units are installed within a cable shaft and concatenated over the main distribution lines.

Each branch unit comprises first and second main distribution line switches, and a housing for shielding the switches.

Each branch unit comprises first and second distribution switches, and a housing for shielding the switches. The switches are located in the lower part of the housing with the junctions facing up. A branch distribution line and main distribution lines are taken in from above the housing.

For a compact power package, a supply bushing and a load bushing are arranged on the top of a transformer, and then shielded with closed housings. A switch is installed in the closed housing for the supply bushing, and a distribution board is placed on the closed housing for the transformer.

In order to realize the supply and load terminals in a power package with independent closed structures, a supply bushing and a load bushing are arranged on the top of a transformer, and two independent closed housings are mounted on the top of the transformer. One of the closed housings serves as a switch room for storing a switch directly coupled with a conductor penetrating through the supply bushing, while the other closed housing serves as a bus room in which a bus connected to the conductor penetrating through the load bushing is laid.

In order to design a transformer in a power package compactly, a gas-insulated transformer is adopted.

In order to provide long-term reliability for a high-tension circuit, the switch room in the above structure is realized with a gas-insulated container filled with insulation gas.

For easy mounting or dismounting of a switch, at least a junction between a switch and a transformer is made up of a contact and a contact conductor that is freely coupled with or decoupled from the contact.

In a distributor relating to the present invention, load switches are connected to multiple branch points on first and second main distribution lines emerging from a receiver switching apparatus. The load terminals of each pair of the load switches connected on the first and second main distribution lines are coupled with each other as a common from which a branch line extends to each of distributed loads via a switch and a transformer.

Switches are combined in twos to form independent branch units. The branch units are connected in series with one another on main distribution lines emerging from a receiver switching apparatus, thus forming a trunk. Power packages, in each of which another switch and a transformer are connected in series with each other, are connected to the branch units, and extending branch lines to loads.

In the present invention, power is fed to the vicinities of distributed loads over main distribution lines. Power is then supplied to the loads over branch distribution lines branching out from the main distribution lines. Switches are installed across each branch point on the main distribution lines, which control the orientation of power flowing into the corresponding branch distribution line. A switch is also inserted to each branch distribution line, so that the branch distribution line can be disconnected from either of the main distribution lines.

Each pair of switches on the main distribution lines, which are coupled with each of branch distribution lines, is formed as a single branch unit. A switch and a transformer on each branch distribution line are united as a power package. A simple configuration ensues.

Branch units are installed in a cable shaft, thus diminishing an installation space.

In each branch unit, a junction with a main distribution line or a switch is shielded with a housing. If fire should break out at the junction or switch, the outside of the branch unit can be held unsusceptible to the influence of the fire.

Switches in each branch unit are installed with the junctions thereof facing up. The cable of a main distribution line or branch distribution line is therefore taken in from above the branch unit.

A supply bushing and load bushing are arranged on the top of a transformer, and shielded with closed housings. The supply bushing is coupled with a switch. This structure helps reduce the installation area of a distributor.

In each power package, a switch room and a bus room are formed as independent closed structures. A failure of either of the structures will not influence the other one. During maintenance inspection, the structures will not be disturbed by a high-tension charger. Thus, maintenance inspection can be achieved with safety.

A gas-insulated transformer is adopted as a transformer in each power package, which results in a compactly-designed distributor.

A switch room in each power package is filled with insulation gas, thus shutting out the environmental factors deteriorating the insulation performance of a high-tension circuit. This provides long-term reliability.

The junction with a switch in each power package consists of a contact and a contact conductor. This obviates bolting, and simplifies and speeds up mounting or dismounting of a high-tension switch.

PREFERRED EMBODIMENTS OF THE INVENTION

Figure 1:
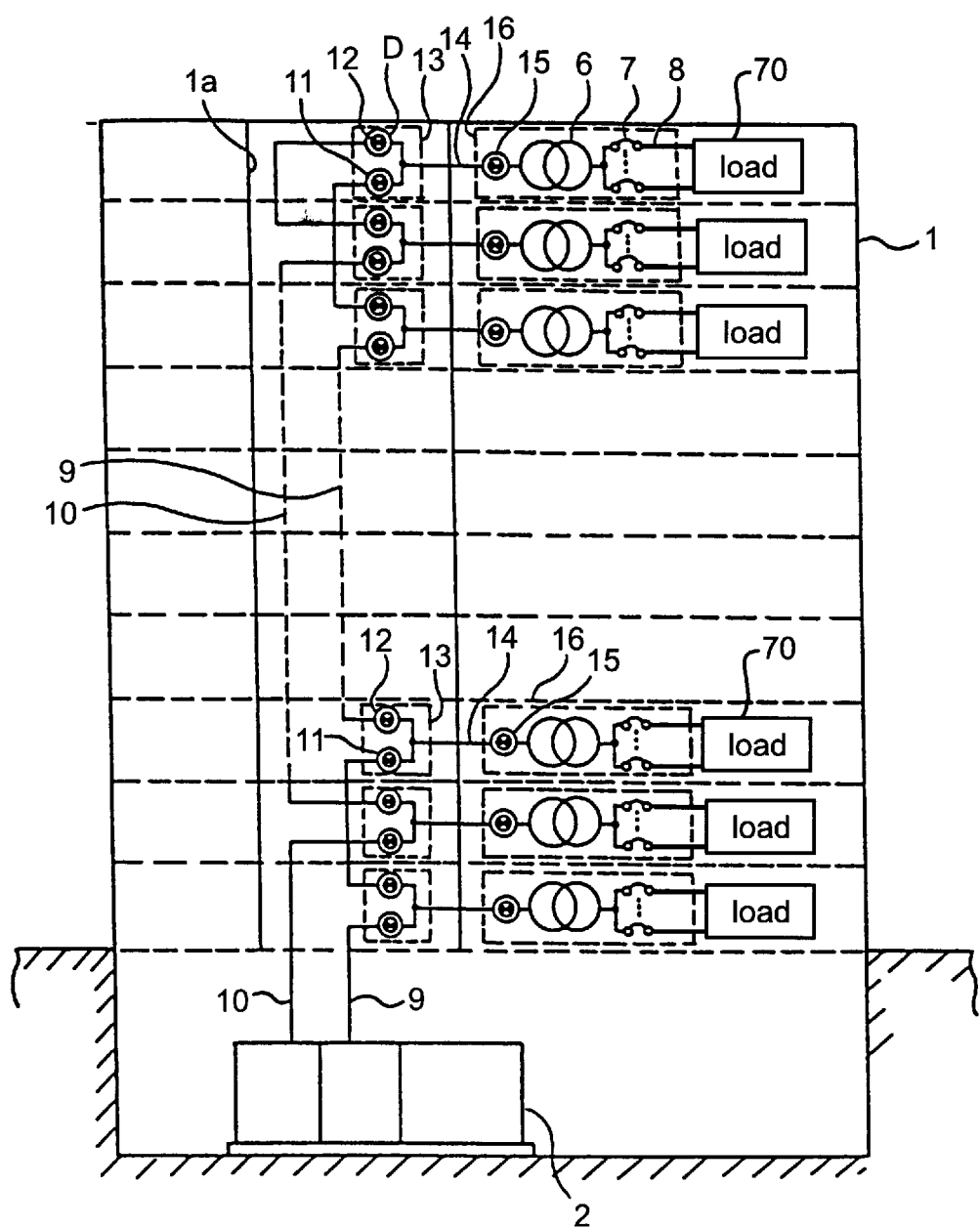
FIG. 1 is a distribution system diagram showing the first embodiment of a distributor according to the present invention.

FIG. 1 shows a distribution system in a building according to an embodiment of the present invention. In FIG. 1, 1 denotes a building. 1a denotes a cable shaft extending vertically within the building 1. 2 denotes a receiver switching apparatus installed in an electric room on the basement of the building 1. 6 denotes transformers. 7 denotes molded-case circuit breakers associated to loads 70. 8 denotes cables leading to the loads 70. 9 and 10 denote main distribution lines which are emerging from the receiver switching apparatus 2 and laid within the cable shaft 1a. 11 and 12 denote main distribution line switches that are connected in series with one another on the main distribution lines 9 and 10 and installed across respective branch points. 11 denotes first switches, while 12 denotes second switches. 13 denotes branch units containing the main distribution line switches 11 and 12. 14 denotes branch distribution lines extending from the branch units 13. 15 denotes load switches connected on the branch distribution lines 14. 16 denotes power packages each containing a transformer 6 and one of the load switches 15. In FIG. 1, the molded-case circuit breakers 7 are included in the power packages 6. The molded-case circuit breakers 7 may be installed outside the power packages 16.

Figure 2:
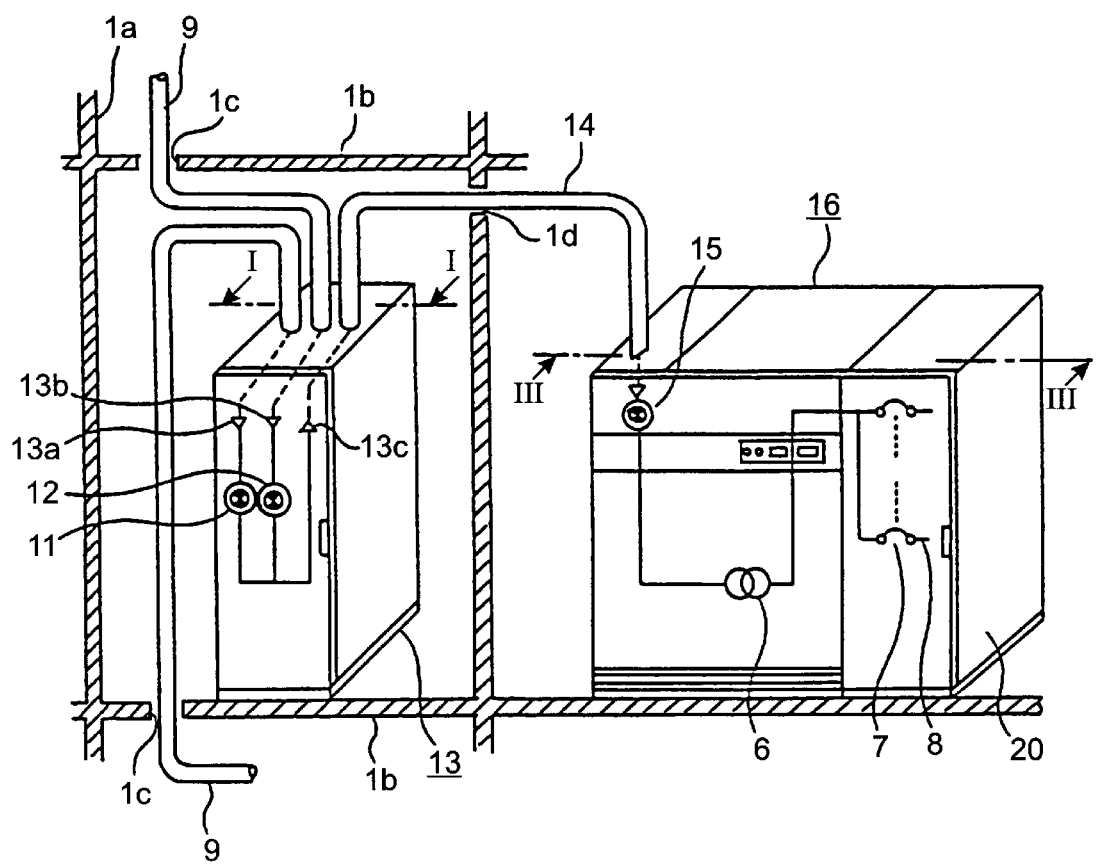
FIG. 2 is an oblique view showing the installation of a branch unit and a power unit in the first embodiment of a distributor according to the present invention.

FIG. 2 is a schematic diagram showing the appearances of a branch unit 13 and a power package 16, and the cable connection. In FIG. 2, 1b denotes a partitioning member for partitioning the inside of the cable shaft up and down. 1c denotes a through hole bored on the partitioning member 1b. 1d denotes a through hole bored on the side wall of the cable shaft 1a. 13a and 13b are junctions between main distribution switches 11 and 12, and main distribution lines 9. 13c denotes a junction with a branch distribution line 14.

Figure 3:
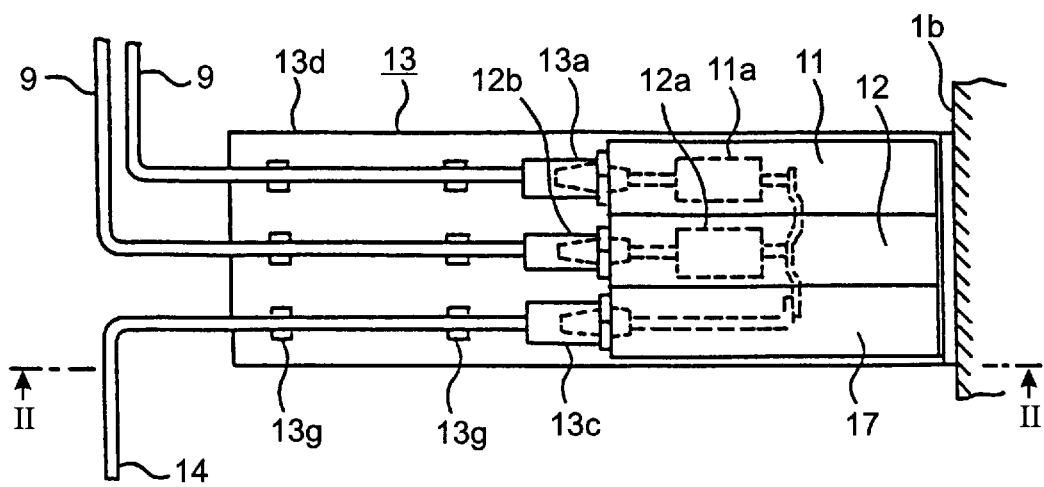
FIG. 3 shows a cross section along the line A—A of FIG. 2.
Figure 4:
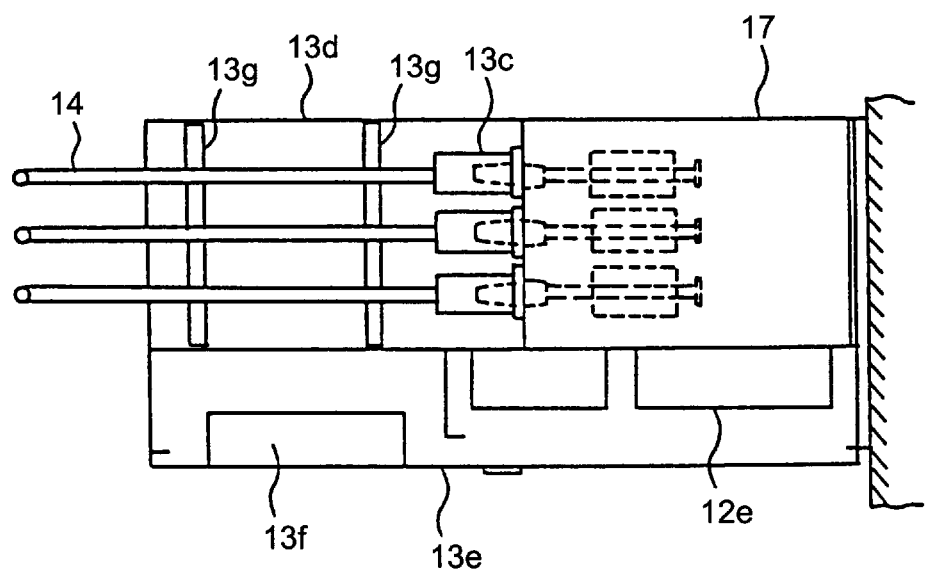
FIG. 4 shows a cross section along the line B—B of FIG. 3.

FIG. 3 is a cross-sectional diagram illustrating the branch unit 13 in FIG. 2 along the line A—A. FIG. 4 is a cross-sectional diagram illustrating FIG. 3 along the B—B. 11 and 12 denote main distribution switches placed in parallel with each other beneath the branch unit 13 with the junctions 13a and 13b facing up. In FIG. 3, three phase switching devices 11a or 12a are installed in the depth direction of the main distribution line switch 11 or 12. 17 denotes a branch, which has the same appearance as those of the main distribution switches 11 and 12. The branch 17 has a junction 13c at one end thereof. The junction 13c is coupled with a common junction of the main distribution switches 11 and 12 within the branch 17. 12b denotes an operating mechanism for the main distribution line switch 12. 13d denotes a housing for the branch unit 13, shielding the junctions 13a to 13c. 13e denotes a front door of a branch unit 13, in the upper part of which a display unit 13f is mounted to enable observation from outside. 13g denotes cable supports for supporting main distribution lines 9 and a branch distribution line 14.

Figure 5:
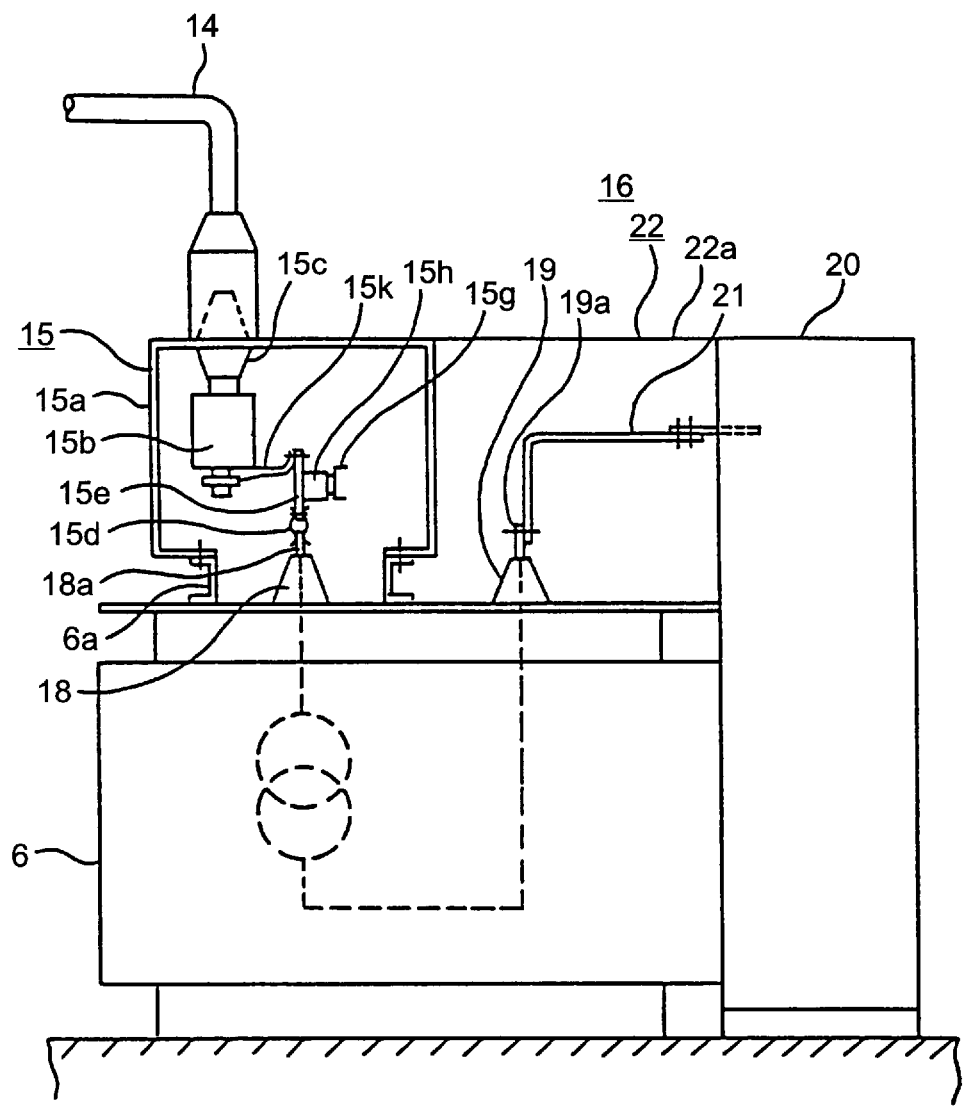
FIG. 5 shows a partial cross section along the line C—C of FIG. 2.
Figure 6:
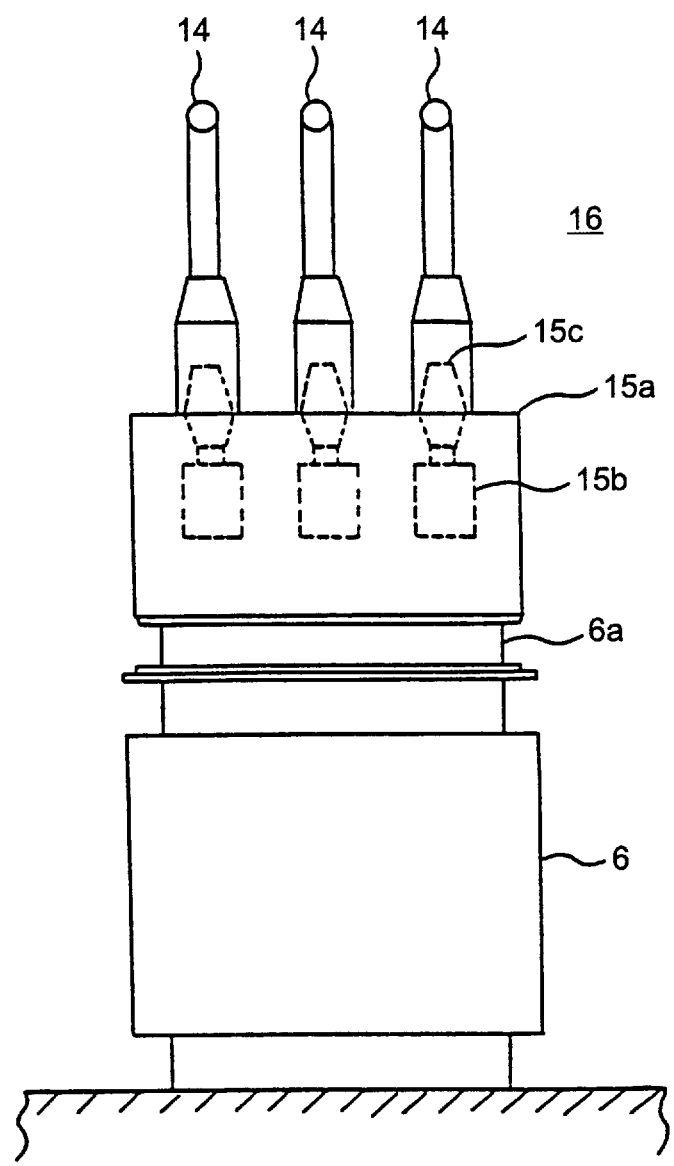
FIG. 6 is a left side view of FIG. 5.

FIG. 5 is a partial cross-sectional diagram illustrating the power package 16 in FIG. 2 along the line C—C. FIG. 6 shows the left side of FIG. 5. In this embodiment, a gas-insulated transformer is adopted as a transformer 6. 18 and 19 denote bushings placed on the top of the transformer 6. 18 denotes a supply bushing, while 19 denotes a load bushing. 20 denotes a distribution board that accommodates a molded-case circuit breaker 7 connected to a load and adjoins the side of the transformer 6. 21 denotes a bus linking a terminal 19a of the bushing 19 with the distribution board 20. 22 denotes a closed housing for shielding the bushing 19 on the top of the transformer 6 and the top and side of the bus 21. 15 denotes a switch. Switching devices 15b operated by a means, which is not shown, are located in a sealed container 15a and fixed to the sealed container 15a via a bushing 15c. There are three switching sections 15b (for three phases) and the three switching sections 15b line up in the depth direction in FIG. 5. 15d denotes a contact supported by a conductor 15e. The contact 15d is coupled with an end of a bushing terminal 18a (contact conductor) so as to be freely decoupled therefrom. The conductor 15e is supported by a supporting member 15g that is fixed to the sealed container 15e via an insulator 15h. One end each of the switching devices 15b is connected to end of the conductor 15e via flexible conductors 15k. The sealed container 15a is filled with insulation gas such as $SF_6$ gas.

6a denotes a coupling flange that surrounds annularly the side circumference of the bushing 18a and is attached to the top of the transformer 6 in an airtight manner. The coupling flange 6a is coupled with the sealed container 15a having an opening on the bottom.

In this embodiment, a closed cover 22a and the sealed container 15a are separate members. The final assembly or the combination of the closed cover 22a and sealed container 15a constitutes the closed housing 22. When the switch 15 is to be dismounted from the transformer 6, the coupling flange 6a is disconnected from the sealed container 15a and the switch 15 is lifted. The contact 15d then departs from the bushing terminal 18a. This completes the dismounting of the switch 15.

In a distributor having the aforesaid configuration, the main distribution lines 9 and 10 emerging from the receiver switching apparatus 2 ascend within the cable shaft 1a, and alternately couple i.e., alternately concatenate, the main distribution line switches 11 and 12, which are located in the branch units 13, in series with one another. The main distribution lines 9 and 10 are linked with each other on the uppermost floor, thus forming a loop. In actual power transmission, a distributor is operated in such a state that any one of the switches 11 and 12 in the loop is opened to create an open loop. This is intended to simplify the locating of the point of any accident if one occurs. For instance, when the distributor is operated with the switch 12 at a point D on the uppermost floor being broken, the power supply to loads on the uppermost floor is achieved over the main distribution line 9 via the branch distribution lines 14, switches 15, transformers 6, molded-case circuit breakers 7, and cables 8.

To stop the power supply to a load, a switch 15 associated with the load must be open. When the power supply to an entire power package 16 must be stopped due to a failure of any transformer 6 or a change in the installed capacity of a load, the main distribution switches 11 and 12 directly connected to the power package 6 are opened. Thus, while power is being fed to the loads on the other floors, the power supply to the floor concerned alone can be stopped. If any branch unit 13 fails, the switches 11 and 12 for the branch unit 13 connected across the branch unit 13 are opened to stop the power supply to the branch unit 13. Inspection, repair, or replacement can then be carried out.

In this embodiment, in each branch unit 13, switches 11 and 12 and junctions 13a, 13b, and 13c, which are prone to a fire, are shielded with a housing 13d. An accident is therefore unlikely to expand, and high safety is ensured. The main distribution line switches 11 and 12 are placed in the lower part of each branch unit 13 with their junctions facing up, so that main distribution lines 9 and 10 or a branch distribution line 14 can be pulled in from above the branch unit 13 and then connected. This structure allows an operator to carry out cable connection at the height of his/her chest. The connection work is therefore easy to do. Moreover, the installation area can be diminished. As a result, branch units 13 can be installed in a cable shaft. This means that a loop configuration can be realized within a limited installation area.

In this embodiment, a closed housing 22 is placed on a transformer 6. A switch 15 is installed in the closed housing 22. A distribution board 20 is placed adjacent to the side of the transformer 6. Consequently, the installation area for a power package 16 diminishes. When only a small number of molded-case circuit breakers 7 is connected to loads, the upper part of a load bushing 19 on the top of the transformer 6 may be used as the distribution board 20. This further diminishes the installation area for the power package 16. When a gas-insulated transformer is adopted as the transformer 6, with the capacity unchanged, the transformer 6 can be constructed more compactly than a conventional oil-filled transformer or a molded transformer. Furthermore, because the number of combustible materials is limited, safety improves.

In this embodiment, a sealed container 15a for a switch 15 is filled with $SF_6$ gas. The insulation performance therefore improves. Furthermore, the switch 15 becomes unsusceptible to external environmental factors such as pollution, and offers long-term reliability.

A contact 15a is used for the junction of the switch 15 with a transformer 6, which obviates bolting or unbolting for connection. This results in quick and simple mounting or dismounting of the switch 15.

Figure 7:
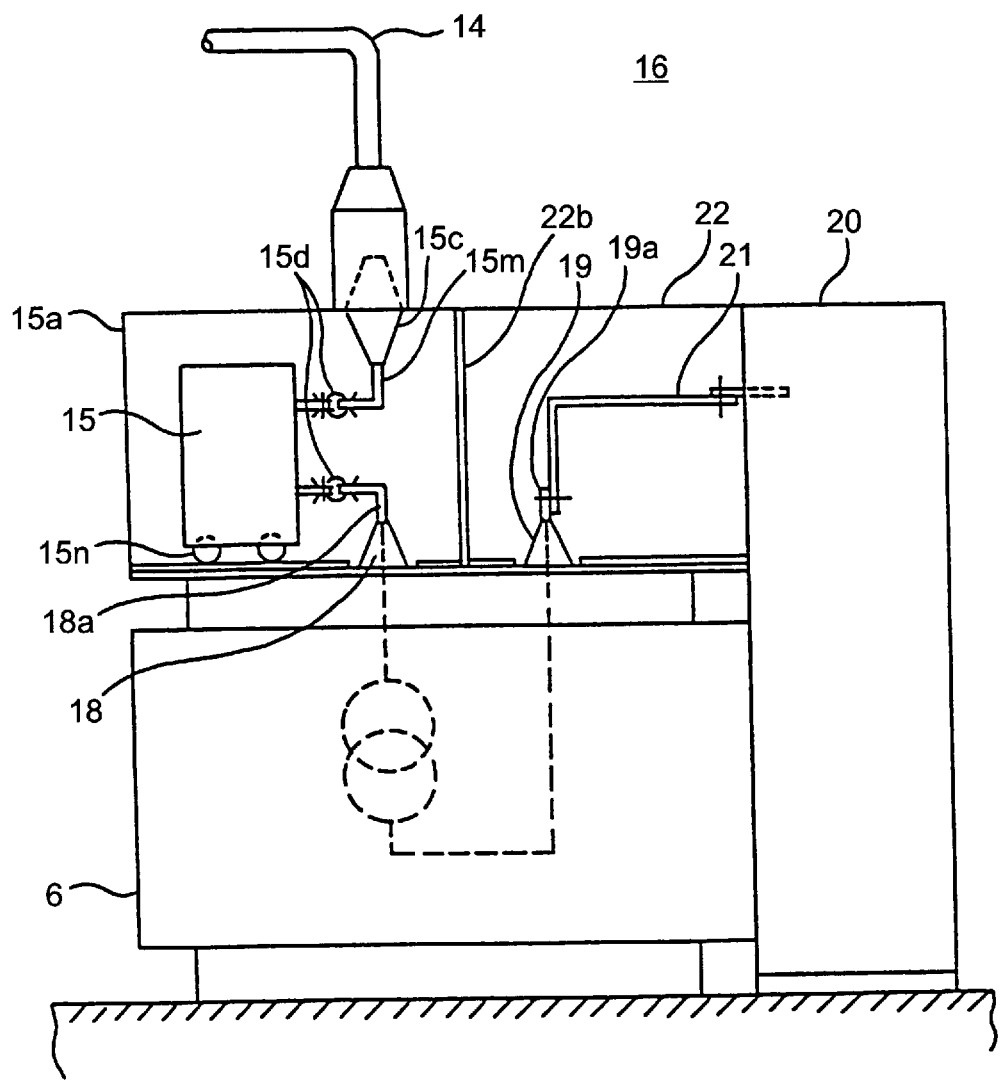
FIG. 7 is a partial cross-sectional view showing a power unit in the second embodiment of a distributor according to the present invention.

FIG. 7 partly shows a side cross section of another embodiment of a power package 16. A closed housing 22 for shielding supply and load bushings 18 and 19 is mounted on the top of a transformer 6. In this embodiment, a switch 15 has moving wheels 15n. The switch 15 can therefore be pulled out sideways in FIG. 7. The tips of the terminals of the switch 15 are provided with contacts 15d, and thus can be coupled with or decoupled from bushing terminals 18a and 15m. The closed housing 22 shields the switch 15 and a bus 21 as a whole. The supply and load bushings 18 and 19 are separated by a ground metallic partition 22b.

In a distributor having the aforesaid structure, the inside of the closed housing 22 is divided into a room for the switch 15 and a room for the bus 21 by the ground metallic partition 22b. A short circuit or other failure in the room for the bus 21 will not affect the supply terminal. During maintenance inspection of the load terminal, since the load terminal is isolated by the ground metallic partition 22b, there is no fear that the load terminal is disturbed by the supply terminal serving as a charger. Thus, safety is ensured. With the movement of the switch 15 due to the wheels 15n, the contacts 15d at the tips of the terminals are coupled with or decoupled from the bushing terminals 15m and 18a respectively. Mounting or dismounting of the switch 15 is therefore very easy to do. This means that the time of a power stoppage for replacement is very short.

In FIG. 7, the closed housing 22 is shared by the supply terminal and the load terminal, and partitioned by installing the ground metallic partition 22b. The closed housing 22 may be made up of respective housings for the supply and load terminals, which also provides the same advantages as that in the aforesaid embodiment.

Figure 8:
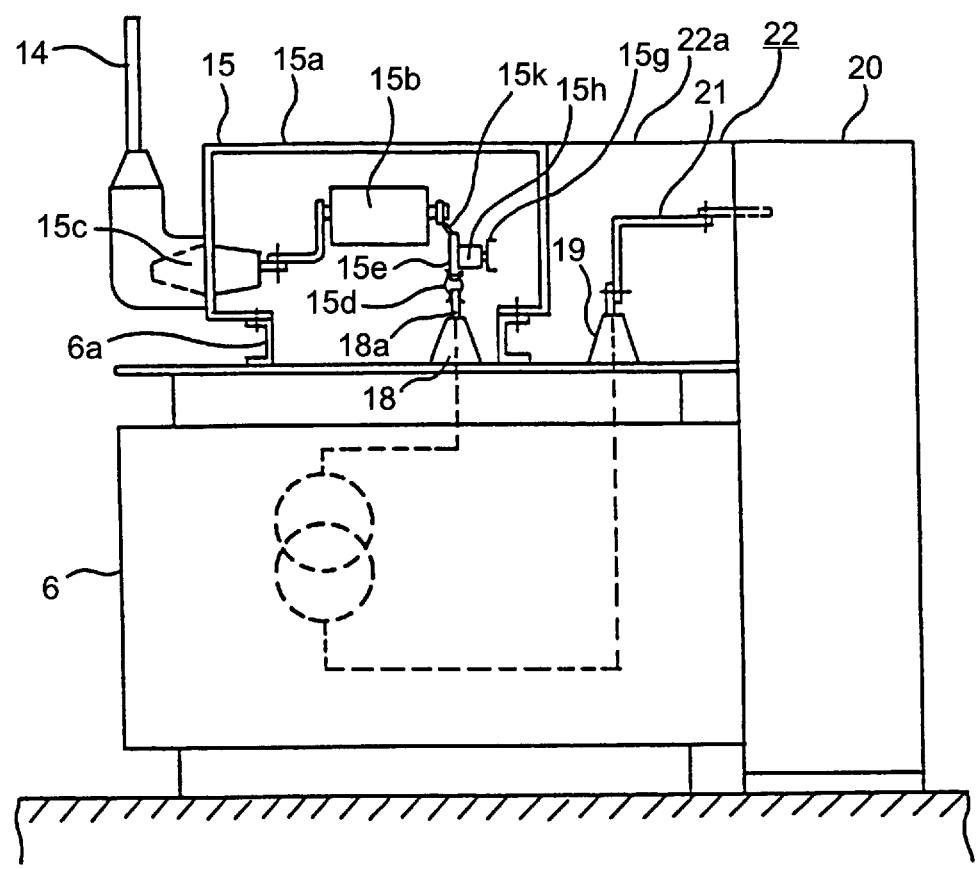
FIG. 8 is a partial cross-sectional view showing a power unit in the third embodiment of a distributor according to the present invention.

FIG. 8 is a cross-sectional diagram showing part of yet another embodiment of a power package 16. In this embodiment, a bushing 15 is projected laterally and coupled with a branch distribution line 14. This arrangement lessens the required height of the power package 16.

Figure 9:
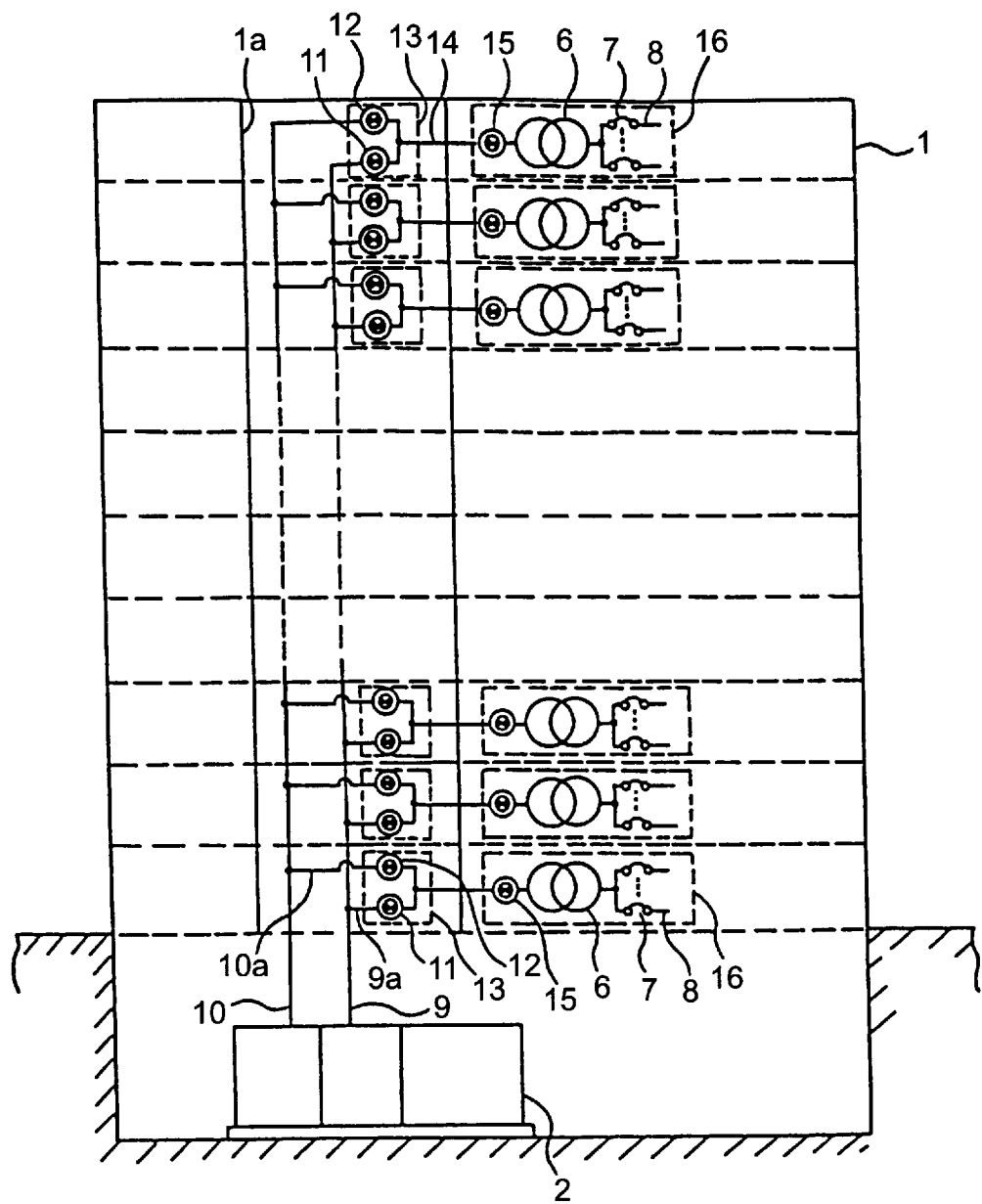
FIG. 9 is a distribution system diagram showing the fourth embodiment of a distributor according to the present invention.
Figure 10:
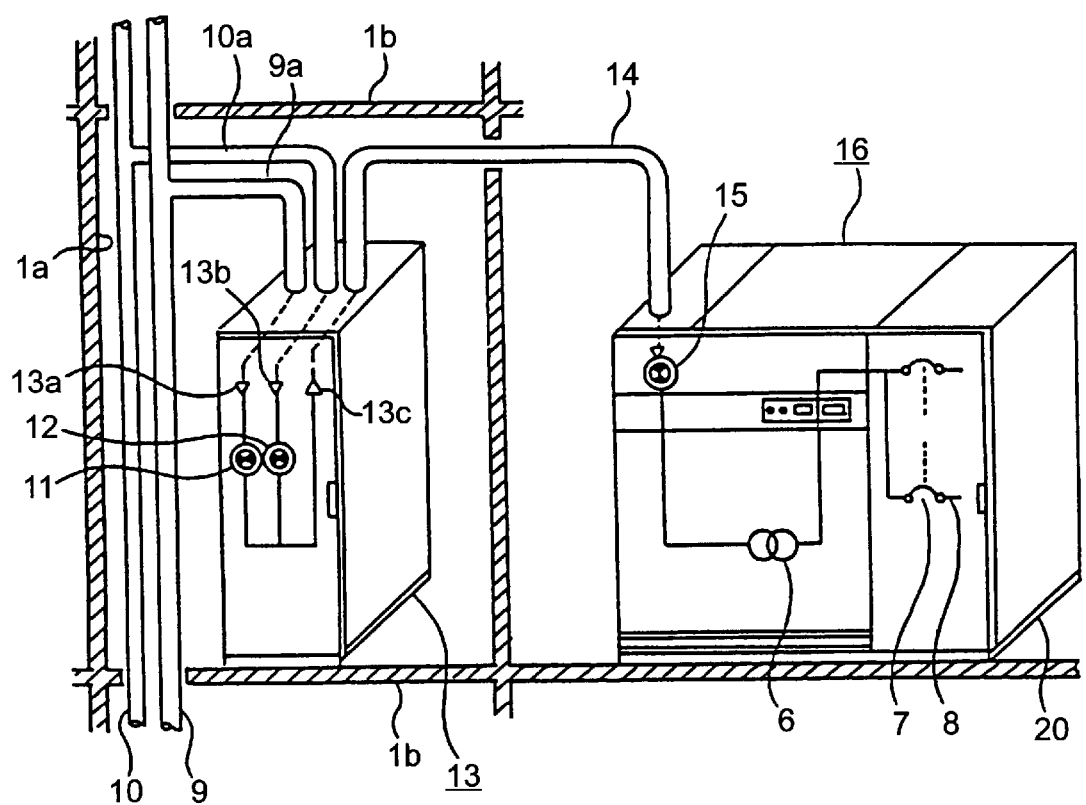
FIG. 10 is an oblique view showing the installation of a branch unit and a power unit in the fourth embodiment of a distributor according to the present invention.
Figure 11:
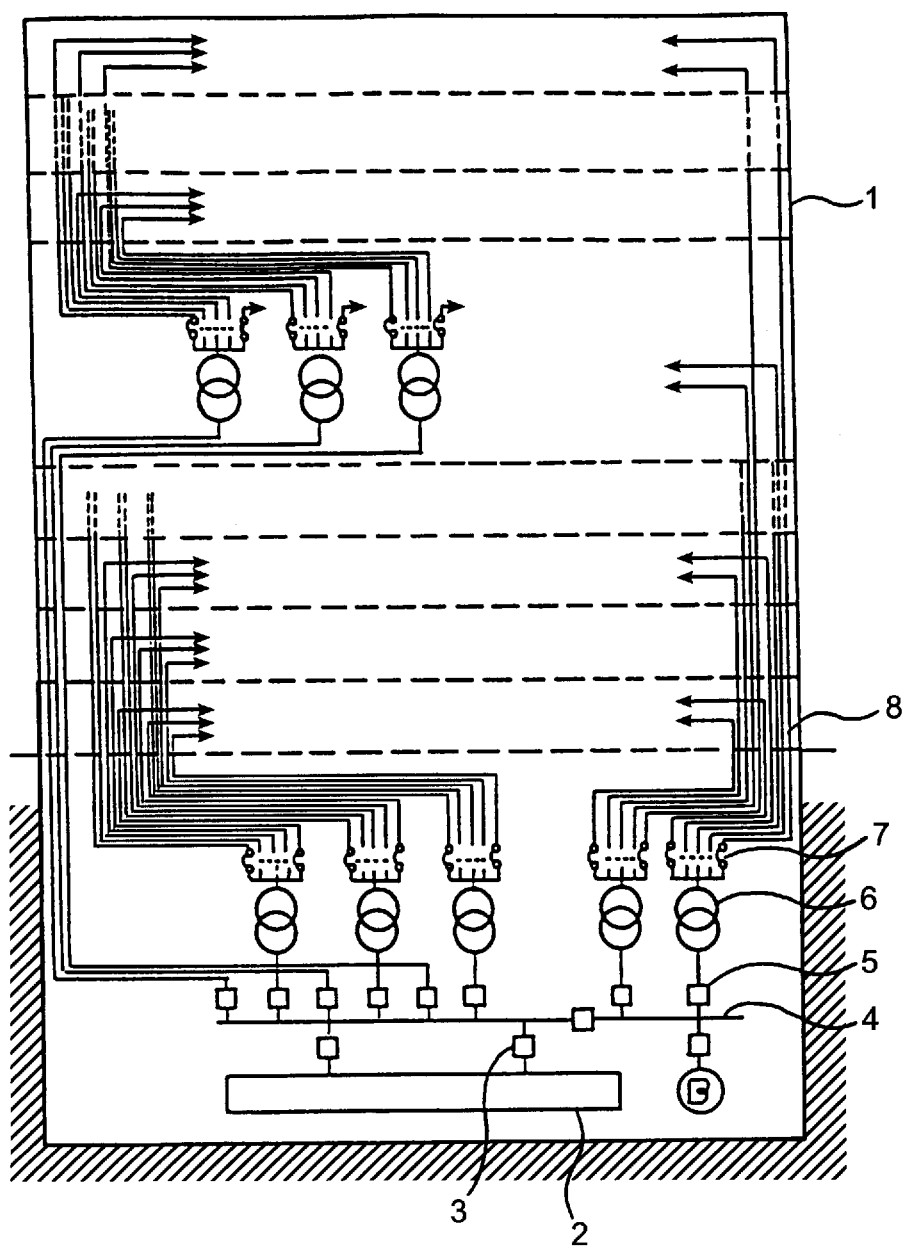
FIG. 11 is a distribution system diagram showing a prior art distributor.

FIGS. 9 and 10 show a distribution system, a branch unit and a power package in yet another embodiment. In FIG. 9, a main distribution line 9 ascends within a cable shaft 1a and leads to switches 11 in branch units 13 via branch lines 9a branching out from T points on the main distribution line 9. A main distribution line 10 ascends within the cable shaft 1a and leads to switches 12 in the branch units 13 via branch lines 10a branching out from T points on the main distribution line 10. Equipment connected to the load terminal beyond each of the branch units 13 are identical to those shown in FIGS. 1 and 2.

In the foregoing configuration, the branch units 13 are connected on both the main distribution lines 9 and 10. In the operational state, either the switch 11 or 12 is open, and power is fed through the other switches. If either of the main distribution lines 9 and 10 fails, the other main distribution line, which has not failed, is activated so as to feed power without interruption. If any of power packages 16 fails, both the switches 11 and 12 corresponding to the power package concerned are opened. This enables safe inspection or replacement without causing power stoppages in the other power packages.

In the first embodiment, a closed housing different from the one forming a bus room is provided as a switch room. The closed housing forming the switch room is realized with a gas-insulated container. In the second embodiment, the inside of a closed housing is divided into a switch room and a bus room using a ground metallic partition. In an alternative embodiment, a closed housing that is of the same kind as and independent of the one forming a bus room may be used as a switch room.

As described above, in a distributor according to the present invention, multiple switches are connected in series with one another on main distribution lines emerging from a receiver switching apparatus, thus forming a trunk. A branch line is extending from a junction between each pair of adjoining switches into each of distributed loads via a switch and a transformer. The number of cables decreases and the man-hours required for cable connection lessens. This results in a distributor capable of being put into operation easily.

Each pair of switches is formed as a single branch unit. The branch units are connected in series with one another on main distribution lines emerging from a receiver switching apparatus, thus forming a trunk. Power packages, in each of which another switch and a transformer are connected in series with each other, are connected to the branch units, and leading branch lines to loads. This results in a distributor capable of being put into operation easily.

Branch units are installed in a cable shaft, and concatenated over main distribution lines. This results in a distributor capable of being installed in a limited space.

Each branch unit consists of first and second main distribution switches and a housing for shielding the switches. This results in compact distributor.

Each branch unit includes at least first and second main distribution switches and a housing for shielding the switches. The switches are located in the lower part of the housing with the junctions facing up. A branch line and main distribution lines are taken in from above the housing. This results in a distributor that requires a limited installation area and simplifies installation work.

A supply bushing and a load bushing are arranged on the top of a transformer in each power package, and shielded with closed housings. A switch is installed in the closed housing for the supply bushing, and a distribution board is placed by the side of the transformer. This results in a compact distributor.

In order to realize the supply terminal and load terminal of each power package with independent closed structures, a supply bushing and a load bushing are arranged on the top of a transformer. Moreover, two independent closed housings are mounted on the top of the transformer. One of the closed housings serves as a switch room for storing a switch directly coupled with a conductor penetrating through the supply bushing. The other closed housing serves as a bus room in which a bus connected to a conductor penetrating through the load bushing is laid. This results in a safe distributor.

A gas-insulated transformer is adopted as a transformer in each power package, which contributes to materialization of a compact distributor.

A gas-insulated container filled with insulation gas is adopted as each switch room, which provides a distributor capable of providing long-term reliability for each switch room.

Each junction between a switch and a transformer is composed of a contact and a contact conductor that can be freely coupled with or decoupled from the contact. This results in a distributor permitting easy maintenance.

In a distributor relating to the present invention, load switches are connected to multiple branch points on first and second main distribution lines emerging from a receiver switching apparatus. The load terminals of each pair of load switches connected on the first and second main distribution lines are coupled with each other as a common from which a branch line extends to each load via a switch and a transformer. This results in a distributor that can feed power without interruption with high reliability and put into operation easily with a simple configuration.

Each pair of switches is formed as a single branch unit. The branch units are connected in series with one another on main distribution lines emerging from a receiver switching apparatus, thus forming a trunk. Power packages, in each of which another switch and a transformer are connected in series with each other, are connected to the branch units and leading branch lines to loads. This results in a distributor capable of feeding power uninterruptedly with high reliability and being put into operation with a simple configuration.

We claim:

1. A distributor, comprising:

a plurality of branch distribution lines to be connected to distributed loads via load switches and transformers;

a plurality of branch units each including first and second main distribution switches in which output terminals of said branch units are coupled with supply terminals of said branch distribution lines and said output terminals of said branch units are connected in parallel with one another; and main distribution lines that emerge from a receiver switching apparatus toward said distributed loads and that alternately concatenate input terminals of said first main distribution switches and said second main distribution switches for each of said branch units on said branch distribution lines, in series.

2. A distributor, comprising:

a plurality of branch distribution lines to be connected to distributed loads via power packages, each of said power packages including a load switch and a transformer;

branch units each including first and second main distribution switches in which output terminals of said first and second main distribution switches are coupled with each other to form output branch junctions which are coupled with said branch distribution lines, and first and second input junctions are coupled with input terminals of said branch unit at said first and second main distribution switches; and main distribution lines that emerge from a receiver switching apparatus toward said distributed loads and alternately concatenate said first and second input junctions of said first and second main distribution switches for each of said branch units in series.

3. A distributor according to claim 2, wherein said branch units are installed within a cable shaft and are concatenated over said main distribution lines.

4. A distributor according to claims 2 or 3, wherein each of said branch units comprises a housing for shielding said first and second main distribution switches; said first and second main distribution switches are located in a lower part of said housing with said first and second input junctions facing up; and one of said branch distribution lines and said main distribution lines are taken in from above said housing.

5. A distributor according to claim 2, wherein each of said branch units comprises a housing for shielding said first and second main distribution switches.

6. A distributor according to claim 3, wherein each of said branch units comprises a housing for shielding said first and second main distribution switches.

7. A distributor according to claims 9 or 10, wherein each of said branch units comprises a housing for shielding said first and second main distribution switches, said first and second main distribution switches are located in a lower part of said housing with said first and second junctions facing up; and one of said branch distribution lines and said first and second main distribution lines are taken in from above said housing.

8. A distributor, comprising:

a plurality of branch distribution lines to be connected to distributed loads via load switches and transformers;

a plurality of branch units each including first and second main distribution switches in which output ends of said branch units are coupled with supply terminals of said branch distribution lines and said output ends of said branch units are connected in parallel with one another;

a first main distribution line that emerges from a receiver switching apparatus toward said distributed loads and sequentially concatenates first input ends of said branch units in said first main distribution switches connected on said branch distribution lines so that power distribution may be selectable provided to said distributed loads by said first main distribution line; and a second main distribution line that emerges from said receiver switching apparatus toward and sequentially concatenates second input ends of said branch units in said second main distribution switches so that power distribution may be selectably provided to said distributed loads by said second main distribution line.

9. A distributor, comprising:

a plurality of branch distribution lines to be connected to distributed loads via power packages, each of said power packages including a load switch and a transformer;

branch units each including first and second main distribution switches in which output ends of said first and second main distribution switches are coupled with each other to form output branch junctions which are coupled with said branch distribution lines, wherein first and second input junctions of each of said branch units are coupled with input ends of said branch units at said first and second main distribution switches;

a first main distribution line that emerges from a receiver switching apparatus toward said distributed loads and concatenates said first input junctions in said branch units sequentially so that power distribution may be selectably provided to said distributed loads by said first main distribution line; and a second main distribution line that emerges from said receiver switching apparatus and concatenates said second input junctions in said branch units sequentially so that power distribution may be selectably provided to said distributed loads by said second main distribution line.

10. A distributor according to claim 9, wherein said branch units are installed within a cable shaft and are concatenated over said first and second main distribution lines.

11. A distributor according to claims 5 or 6, wherein said first and second main distribution switches are located in a lower part of said housing with said first and second input junctions facing up; and one of said branch distribution lines and said main distribution lines are taken in from above said housing.

12. A distributor according to claim 9, wherein each of said branch units comprises a housing for shielding said first and second main distribution switches.

13. A distributor according to claim 12, wherein said first and second main distribution switches are located in a lower part of said housing with said first and second junctions facing up; and one of said branch distribution lines and said first and second main distribution lines are taken in from above said housing.

* * * * *